July 25, 1933.  V. A. T. ALBRIGHT  1,919,352

SAW TEETH

Filed May 6, 1932

INVENTOR
Victor A. T. Albright
BY
Williams Rich & Morse
ATTORNEYS.

Patented July 25, 1933

1,919,352

UNITED STATES PATENT OFFICE

VICTOR A. T. ALBRIGHT, OF BEDFORD, INDIANA

SAW TEETH

Application filed May 6, 1932. Serial No. 609,599.

This invention relates to saw teeth of the type particularly adapted for use in the sawing of stones.

Saw teeth of the above character are provided, as shown in my co-pending application Serial No. 574,846, filed November 13, 1931, with a plurality of cutting elements, such as diamonds which are embedded in the metal of the tooth and are so exposed at the working face or faces of the tooth as to engage the work and effect the sawing operation.

An important object of the present invention is to provide an improved tooth of the character mentioned, which is so constructed as to attain to a higher degree the advantages attained by saw teeth embodying the invention of said co-pending application, namely, a smooth-walled kerf, efficiency from a power-consumption standpoint and smoothness in operation of the saw.

Other objects and advantages of the present invention will become apparent from the following description, taken in connection with the accompanying drawing—in which—

Figure 1:
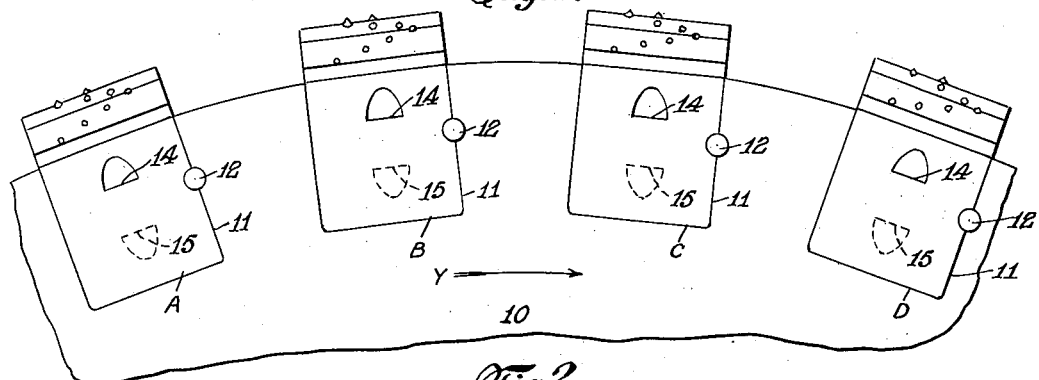
Figure 1 is a fragmental view of a circular saw body, having a plurality of teeth embodying this invention mounted in the peripheral margin thereof.

Referring to the drawing, the numeral 10 indicates a circular saw body or blade, which is adapted to be rotated in the direction of the arrow Y, shown thereon, and in the peripheral margin of which are formed a plurality of tooth-receiving notches 11. Such notches are, of course, provided throughout the peripheral margin of the saw blade and are adapted for the reception of a series of teeth embodying this invention, of which only four, namely, those indicated by the reference characters A, B, C and D, are herein shown. These teeth are spaced from each other throughout the peripheral margin of the saw blade and are held in the respective notches 11 against radial displacement by suitable means, such as locking pins 12, the body portions of the respective teeth being provided on opposite sides with a drive-in notch 14 and a drive-out notch 15 adapted for the reception of a suitable tool, by which, with the aid of a hammer, a series of blows may be delivered to the tooth to drive it in or out of the saw blade, as occasions may require.

Figure 2:
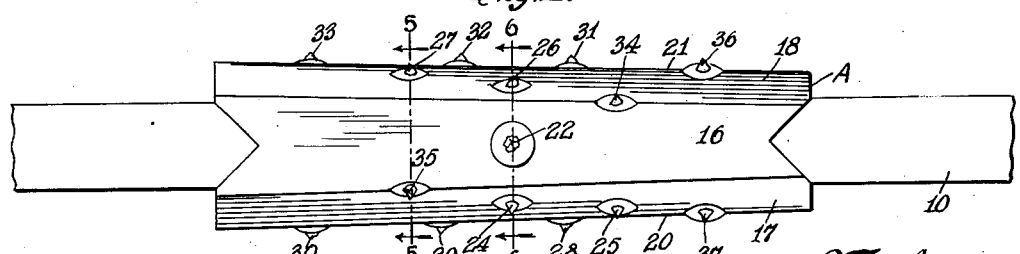
Figure 2 is an enlarged plan view of a portion of the saw body and of one of the teeth thereon.
Figure 3:
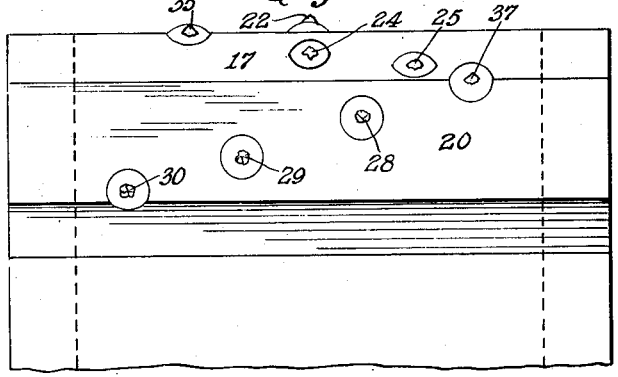
Figure 3 is an enlarged elevation of the upper portion of one of the teeth.

Referring particularly to the tooth A shown in the several figures, it will be noted that the head portion thereof is so formed as to provide cutting-element-carrying faces consisting of an outer face 16, a pair of outwardly and slightly forwardly inclined marginal faces 17 and 18 and a pair of slightly forwardly inclined side faces 20 and 21. Referring particularly to the marginal faces 17 and 18 and the side faces 20 and 21, it will be noted that they are flat and that their angular relation to each other is such that the planes in which these faces are disposed all converge forwardly of the tooth, that is, toward the front of the tooth, when regard is had to the direction of its travel as indicated by the arrow Y in Figure 1, and that the planes in which the marginal faces are disposed also converge toward the outer end of the tooth. Because of the converging relation of the planes of the faces 17, 18, 20 and 21, the shape of the tooth head is such that it tapers along its marginal faces 17 and 18 as well as along its side faces 20 and 21 from its rear toward its front, with the result that the head in plan, as shown in Figure 2, is characterized by its wedge-like formation, it being noted in this connection that the outer face 16, which is disposed in a plane parallel or substantially parallel to the periphery of the saw blade, is similarly shaped in that its width progressively diminishes from the rear of the tooth toward the front thereof.

Embedded in the head of the tooth are a plurality of cutting elements, namely, an outer-face diamond, marginal-face diamonds, side-face diamonds and edge diamonds. These diamonds are preferably anchored in the metal of the tooth by casting the metal about them, as described in my above co-pending application, so that their cutting points are exposed, the diamonds being reinforced against displacement by abutments, which are also formed by the casting operation according to the disclosures of said application, and which surround only the projecting portions of the respective diamonds, as herein shown.

Referring particularly to the above-mentioned diamonds, it will be noted that the outer-face diamond 22 is so located that it projects from the center of the outer face 16 of the tooth. Considering the marginal-face diamonds, of which there are four herein shown, it will be noted that those indicated by the numerals 24 and 25 project from the marginal face 17, and that those indicated by the numerals 26 and 27 project from the marginal face 18. Of these marginal-face diamonds, those indicated by the numerals 24 and 26 are disposed in the transverse plane of the outer-face diamond 22, and those indicated by the numerals 25 and 27 are disposed in transverse planes passing through the tooth respectively in front of and in the rear of the outer-face diamond 22. The diamonds 24 and 25 are disposed in a plane passing transversely through the head portion of the tooth at an acute angle to the outer face 16, and the diamonds 26 and 27 are disposed in a similar plane which intersects the plane of the diamonds 24 and 25 on the transverse medial plane of the tooth, the diamonds 24 and 26 being disposed nearest the front face of the tooth and equidistantly spaced therefrom.

Referring to the side-face diamonds, of which there are six herein shown, those indicated by the numerals 28, 29 and 30 project from the side face 20, and those indicated by the numerals 31, 32 and 33 project from the opposite side face 21. As to the side-face diamonds, it will be noted that they are disposed in a common plane passing transversely through the head portion of the tooth at an acute angle to the outer face 16 thereof, and that the diamonds 28 and 31 are disposed nearest the plane of such outer face. It will also be noted that the pairs of diamonds (28, 31), (29, 32) and (30, 33) are disposed respectively in equidistantly spaced transverse planes passing through the tooth head at points, respectively, forward of the outer-face diamond 22, intermediate the outer-face diamond 22 and the pair of diamonds 30, 33, and rearwardly of the pair of diamonds 29, 32.

Considering the edge diamonds, of which four are herein shown, it will be noted that the edge diamonds 34 and 35 project from the head portion of the tooth on the respective meeting lines between the outer face 16 and the marginal faces 18 and 17, and that the edge diamonds 36 and 37 project from the head portion of the tooth, respectively, on the meeting line of the marginal face 18 with the side face 21 and the meeting line of the marginal face 17 with the side face 20. It is to be noted that the edge diamond 34 is in alignment with the marginal-face diamonds 26 and 27, that the edge diamond 35 is in alignment with the marginal-face diamonds 24 and 25, that these respective edge diamonds are disposed in transverse planes passing through the tooth, respectively in front of and at the rear of the outer-face diamond 22, that the edge diamonds 36 and 37 are in alignment with the respective side-face diamonds (31, 32, 33) and (28, 29, 30) and that they are disposed in a transverse plane passing through the tooth forwardly of the marginal-face diamond 25.

Figure 4:
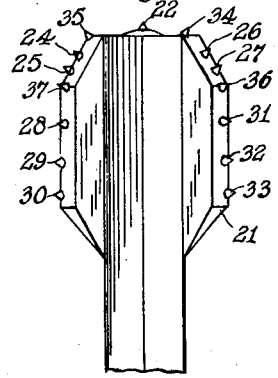
Figure 4 is an end view of what is shown in Figure 3, as viewed from the right in Figure 3.
Figure 5:
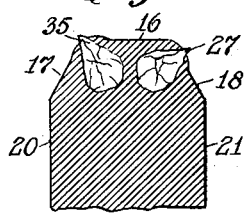
Figure 5 is a transverse sectional view taken on the plane of line 5—5 of Figure 2, with omission of the cutting elements at the rear of such plane.
Figure 6:
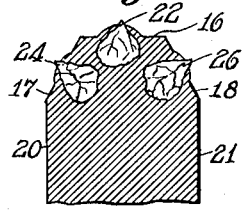
Figure 6 is a transverse sectional view taken on the plane of line 6—6, with omission of the cutting elements at the rear of such plane.

When it is taken into account that the embedded portions of all of the diamonds are very materially larger than their exposed cutting points, it will be readily appreciated, from an inspection of Figure 4, that they are generally disposed so that they overlap in a direction transverse to the tooth or across the direction of operation of the tooth, it being noted from this figure that the disposition of the diamonds is such that no one cutting point is required to traverse the identical path of any other cutting point. In order to further accentuate these advantages, the diamonds—particularly the marginal-face diamonds and side-face diamonds—of one tooth may be slightly offset with respect to the corresponding diamonds of the adjacent tooth. Selecting diamonds 29 of teeth A and B for illustration, the cutting point of diamond 29 of tooth B, instead of being in the direct path of the cutting point of the diamond 29 of tooth A, may be located a few thousandths of an inch at one side or the other of the path of rotation of the cutting point of the diamond 29 of tooth A. Except for such offset relation of diamonds in alternate teeth, all of the teeth A, B, C, and D are identical.

Because of the angular relation of the faces of the tooth embodying this invention and because of the relation of the diamonds one to another, the cutting points of such diamonds are located at progressively varying distances from a plane passing centrally and longitudinally through the tooth, with the result that these diamonds engage the work in a definite progressive order with respect to the outer-face diamond 22, the cutting point of which is at a slightly greater distance from the center of rotation of the saw blade than the cutting points of any of the remaining diamonds, as particularly shown in Figure 4. The order in which the diamonds remove the material from the work at opposite sides of the central, longitudinal plane of the tooth is as follows: diamonds 35, 24, 25, 37, 28, 29, and 30, at one side of such plane, and diamonds 34, 26, 27, 36, 31, 32 and 33 at the other side of such plane, each diamond cutting its own path in an immediately adjacent relation to the path cut by the next preceding diamond. As a result of such progressive operation of the diamonds a cutting operation is assured which produces a smooth-walled kerf with smoothness and efficiency.

Although only one form of the invention is herein shown and described, it will be understood that various modifications may be employed without departing from the spirit of the invention or the scope of the following claims.

What is claimed is:

1. A saw tooth including a metal head portion having inclined marginal faces disposed in planes converging toward the front of the tooth and also toward the outer end of the tooth and a plurality of cutting elements embedded in said metal head portion and exposed at said faces.

2. A saw tooth including a metal head portion having side faces disposed in planes converging toward the front of the tooth and inclined marginal faces disposed in planes converging toward the front of the tooth and also toward the outer end of the tooth, and a plurality of cutting elements embedded in said metal head portion and exposed at said side faces and said inclined marginal faces.

3. A saw tooth including a metal head portion having side faces disposed in planes converging toward the front of the tooth and inclined marginal faces disposed in planes converging toward the front of the tooth and also toward the outer end of the tooth, and a plurality of cutting elements embedded in said metal head portion and exposed at said side faces and said inclined marginal faces, said cutting elements having cutting points projecting from said faces at varying distances from a plane passing centrally and longitudinally through said head portion.

4. A saw tooth including a metal head portion having side faces disposed in planes converging toward the front of the tooth and inclined marginal faces disposed in planes converging toward the front of the tooth and also toward the outer end of the tooth, and a plurality of cutting elements embedded in said metal head portion and exposed at said side faces and said inclined marginal faces, said cutting elements having cutting points projecting from said faces at varying distances from a plane passing centrally and longitudinally through said metal head portion, different groups of the cutting elements at each side of said central plane being disposed in different planes passing transversely through said metal head portion at an acute angle to the outer face thereof and being disposed in an overlapping relation across the direction of operation of the tooth.

5. A saw tooth including a metal head portion having an outer face, and having inclined marginal faces disposed in planes converging toward the front of the tooth and also towards the outer end of the tooth, and a plurality of cutting elements embedded in said metal head portion, some of which cutting elements are exposed at said outer face and said inclined marginal faces and others of which are exposed on the meeting lines of said outer face with said inclined marginal faces.

6. A saw tooth including a metal head portion having an outer face, and having inclined marginal faces disposed in planes converging toward the front of the tooth and also towards the outer end of the tooth, and a plurality of cutting elements embedded in said metal head portion, some of which cutting elements are exposed at said outer face and said inclined marginal faces and others of which are exposed on the meeting lines of said outer face with said inclined marginal faces, said cutting elements having cutting points projecting from said metal head portion at varying distances from a plane passing centrally and longitudinally through said head portion.

7. A saw tooth including a metal head portion having an outer face, and having inclined marginal faces disposed in planes converging toward the front of the tooth and also towards the outer end of the tooth, and a plurality of cutting elements embedded in said metal head portion, some of which cutting elements are exposed at said outer face and said inclined marginal faces and others of which are exposed on the meeting lines of said outer face with said inclined marginal faces, said cutting elements having cutting points projecting from said head portion at varying distances from a plane passing centrally and longitudinally through said metal head portion, different groups of the cutting elements at each side of said central plane being disposed in different planes passing tranversely through said metal head portion at an acute angle to the outer face thereof and being disposed in an overlapping relation across the direction of operation of the tooth.

8. A saw tooth including a metal head portion having an outer face, side faces disposed in planes converging toward the front of the tooth, and inclined marginal faces disposed in planes converging toward the front of the tooth and also toward the outer end of the tooth, and a plurality of cutting elements embedded in said metal head portion, some of which cutting elements are exposed at said outer face and said side faces and said inclined marginal faces and some of which are exposed on the respective meeting lines between said outer face and said inclined marginal faces, and others of which are exposed on the respective meeting lines between said inclined marginal faces and said side faces.

9. A saw tooth including a metal head portion having an outer face, side faces disposed in planes converging toward the front of the tooth, and inclined marginal faces disposed in planes converging toward the front of the tooth and also toward the outer end of the tooth, and a plurality of cutting elements embedded in said metal head portion, some of which cutting elements are exposed at said outer face and said side faces and said inclined marginal faces and some of which are exposed on the respective meeting lines between said outer face and said marginal faces, and others of which are exposed on the respective meeting lines between said marginal faces and said side faces, said cutting elements having cutting points projecting from said metal head portion at varying distances from a plane passing centrally and longitudinally through said metal head portion.

10. A saw tooth including a metal head portion having an outer face, side faces disposed in planes converging toward the front of the tooth, and inclined marginal faces disposed in planes converging toward the front of the tooth and also toward the outer end of the tooth, and a plurality of cutting elements embedded in said metal head portion, some of which cutting elements are exposed at said outer face and said side faces and said inclined marginal faces and some of which are exposed on the respective meeting lines between said outer face and said inclined marginal faces, and others of which are exposed on the respective meeting lines between said inclined marginal faces and said side faces, said cutting elements having cutting points projecting from said metal head portion at varying distances from a plane passing centrally and longitudinally through said metal head portion, different groups of the cutting elements at each side of said central plane being disposed in different planes passing transversely through said metal head portion at an acute angle to said outer face thereof and being disposed in an overlapping relation across the direction of operation of the tooth.

11. A saw tooth including a metal head portion having side faces disposed in planes converging toward the front of the tooth, and a plurality of cutting elements embedded in said metal head portion and projecting from said faces and having their cutting points spaced apart and disposed at varying distances from a plane passing centrally and longitudinally through said metal head portion, which varying distances increase from the front of the tooth toward the rear of the tooth.

12. A saw tooth including a metal head portion having side faces disposed in planes converging toward the front of the tooth, and a plurality of cutting elements embedded in said metal head portion and projecting from said faces and having their cutting points spaced apart and disposed at varying distances from a plane passing centrally and longitudinally through said metal head portion, which varying distances increase from the front of the tooth toward the rear of the tooth, said cutting elements being disposed in an overlapping relation across the direction of operation of the tooth.

13. A saw tooth including a metal head portion having side faces disposed in planes converging toward the front of the tooth, and a plurality of cutting elements embedded in said metal head portion and projecting from said side faces and having their cutting points spaced apart and disposed at varying distances from a plane passing centrally and longitudinally through said metal head portion, which varying distances increase from the front of the tooth toward the rear of the tooth, the cutting elements at each side of said central plane being disposed in a plane passing transversely through said metal head portion at an acute angle to the outer face thereof and being disposed in an overlapping relation across the direction of operation of the tooth.

VICTOR A. T. ALBRIGHT.